(12) United States Patent
Wang

(10) Patent No.: US 10,331,594 B2
(45) Date of Patent: Jun. 25, 2019

(54) DATA TRANSMISSION METHOD AND ELECTRONIC DEVICE

(71) Applicant: AutoChips, Inc., Hefei, Anhui Province (CN)

(72) Inventor: Zhanyong Wang, Hefei (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 44 days.

(21) Appl. No.: 14/453,607

(22) Filed: Aug. 6, 2014

(65) Prior Publication Data

US 2015/0127859 A1 May 7, 2015

(30) Foreign Application Priority Data

Nov. 4, 2013 (CN) .......................... 2013 1 0539183

(51) Int. Cl.
*G06F 13/38* (2006.01)
*G06F 3/12* (2006.01)
*G06F 3/14* (2006.01)

(52) U.S. Cl.
CPC .......... *G06F 13/385* (2013.01); *G06F 3/1271* (2013.01); *G06F 3/1462* (2013.01)

(58) Field of Classification Search
CPC ..... G06F 3/1271; G06F 3/1462; G06F 13/385
USPC .......................................................... 710/63
See application file for complete search history.

(56) References Cited

U.S. PATENT DOCUMENTS

| 6,502,155 | B1 * | 12/2002 | Kondo | G06F 1/14 455/403 |
|---|---|---|---|---|
| 7,035,948 | B1 * | 4/2006 | Liang | G06F 13/28 710/310 |
| 8,010,630 | B2 * | 8/2011 | Barreto | H04L 29/08846 709/219 |
| 2006/0069841 | A1 * | 3/2006 | Qin | G06F 13/4295 710/313 |
| 2006/0104295 | A1 * | 5/2006 | Worley | G06F 9/544 370/401 |
| 2007/0294457 | A1 * | 12/2007 | Gantman | G06F 3/0605 710/313 |
| 2009/0138631 | A1 * | 5/2009 | Hung | G06F 13/4291 710/48 |

(Continued)

FOREIGN PATENT DOCUMENTS

CN 101710313 A 5/2010
CN 101777032 A 7/2010

*Primary Examiner* — Farley Abad
*Assistant Examiner* — Getente A Yimer
(74) *Attorney, Agent, or Firm* — Cheng-Ju Chiang

(57) ABSTRACT

A data transmission method and an electronic apparatus are disclosed. The data transmission method comprises: establishing transmission channels between the local endpoints and a plurality of remote endpoints, wherein at least one of the local endpoints corresponds to at least two of the remote endpoints and at least two transmission channels are established; and transmitting data by using the transmission channels in a time-slice manner between the local endpoints and the corresponding remote endpoints. The data transmission method and the electronic apparatus of the present disclosure can achieve data transmission between a USB host and a plurality of USB devices even when the number of remote endpoints included in the USB devices is greater than the number of local endpoints included in the USB host.

20 Claims, 6 Drawing Sheets

(56) References Cited

U.S. PATENT DOCUMENTS

2010/0211698 A1* 8/2010 Krishnaswamy ..... H04W 4/003
          710/11
2011/0225323 A1* 9/2011 Duron .................. G06F 13/385
          710/8
2013/0114402 A1* 5/2013 Ould-Brahim ...... H04L 43/0811
          370/225

* cited by examiner

DATA TRANSMISSION METHOD AND ELECTRONIC DEVICE

FIELD OF THE DISCLOSURE

The present disclosure relates to the technical field of embedded electronic apparatuses, and more particularly, to a data transmission method used in a USB host for establishing transmission channels between the USB host and a plurality of remote endpoints and a related electronic device.

BACKGROUND OF THE DISCLOSURE

Nowadays, USB technologies have been widely used in embedded electronic apparatuses. Specifically, a USB host is usually integrated in an embedded electronic apparatus to control USB devices (e.g., USB drives, USB mice and so on) plugged into the embedded electronic apparatuses to accomplish functions supported by the USB devices. Usually, the number of local endpoints in the USB host has already been defined during designing the chip of the USB host. It can be understood by those skilled in the art that, according to the protocol specified in the USB standard, the USB host obtains a function interface description information of a USB device according to an interface descriptor when the USB device is plugged in, then obtains remote endpoints corresponding to the function interface and establishes logic channels between the local endpoints and the remote endpoints. The local endpoints correspond to the remote endpoints and the logic channels are formed therebetween. Data transmission between the USB host and the USB device can be carried out via the logic channels to therefore achieve the functions supported by the USB device. In this case, the USB host is expected to support USB devices as much as possible. Under the circumstances that the number of local endpoints included in the USB host is smaller than the number of remote endpoints included in all USB logic devices expected to be supported by the host, some of the USB logic devices are impossible to establish channels with the USB host, since there is not enough local endpoints for pairing. Consequently, the functions of these USB logic devices would not be accomplished.

To solve the previously mentioned problems, a practice in the prior art is to redesign chip of the USB host to increase number of the local endpoints supported by the USB host or to increase the number of USB controllers. However, it costs and takes time to redesign the chip, which is unfavorable in production of the embedded electronic apparatuses.

Another practice in the prior art is to re-plan the USB functions of the embedded electronic apparatuses to reduce the number of USB logical devices and the corresponding functions supported by the USB host to comply with number of the local endpoints. However, it will impair market competitiveness of the embedded electronic apparatuses, which is unfavorable for marketing.

Thus, there remains a considerable need for devices and methods that can flexibly pair the USB host and the USB device even when the number of remote endpoints included in multiple USB logic devices is greater than the number of local endpoints included in the USB host.

SUMMARY OF THE DISCLOSURE

In accordance with exemplary embodiments of the present invention, a data transmission method for used in a USB host for establishing transmission channels between the USB host and a plurality of remote endpoints and a related electronic device are proposed.

According to an embodiment of the present disclosure, a data transmission method for a USB host having a plurality of local endpoints is provided. The data transmission method includes: establishing transmission channels between the local endpoints and a plurality of remote endpoints, wherein at least one of the local endpoints corresponds to at least two of the remote endpoints and at least two transmission channels are established; and transmitting data by using the transmission channels in a time-slice manner between the local endpoints and the corresponding remote endpoints.

According to another embodiment of the present disclosure, an electronic device, comprising a USB host having a plurality of local endpoints is provided. The electronic device includes a channel establishing module and a data transmission module. The channel establishing module is configured to establish transmission channels between the local endpoints and a plurality of remote endpoints, wherein at least one of the local endpoints corresponds to at least two of the remote endpoints and at least two transmission channels are established. The data transmission module is configured to transmit data by using the transmission channels in a time-slice manner between the local endpoints and the corresponding remote endpoints.

These and other objectives of the present invention will no doubt become obvious to those of ordinary skill in the art after reading the following detailed description of the preferred embodiment that is illustrated in the various figures and drawings.

DETAILED DESCRIPTION OF THE DISCLOSURE

Some terms are used in this specification and the claims to designate particular components. As can be appreciated by those skilled in the art, these components may be termed differently by manufacturers. In this specification and the claims, the components are not distinguished by their designations but are distinguished by functional differences there between. The word "couple" used throughout the specification and the claims comprises any direct and/or indirect electrical coupling means. Therefore, if it is described herein that a first device is coupled to a second device, it means that the first device may be electrically coupled to the second device directly or electrically coupled to the second device indirectly through other devices or coupling means. Herein below, the present disclosure will be detailed with reference to the attached drawings and embodiments thereof.

Figure 1:
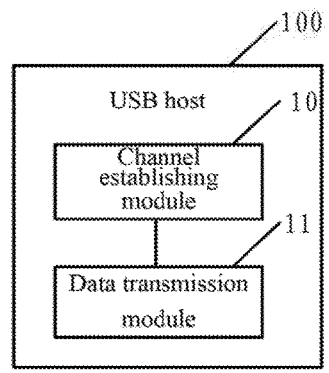
FIG. 1 is a schematic structural view of an electronic device according to a first embodiment of the present disclosure.

FIG. 1 is a schematic structural view of an electronic device according to a first embodiment of the present disclosure. As shown in FIG. 1, the electronic device comprises a USB host 100 which includes a plurality of local endpoints. The USB host 100 comprises a channel establishing module 10 and a data transmission module 11.

The channel establishing module 10 is configured to establish transmission channels between the local endpoints and a plurality of remote endpoints. At least one of the local endpoints corresponds to two or more of the remote endpoints and at least two transmission channels are established.

The data transmission module 11 is coupled to the channel establishing module 10 and is configured to transmit data via the transmission channels between the local endpoints and the corresponding remote endpoints.

Figure 2:
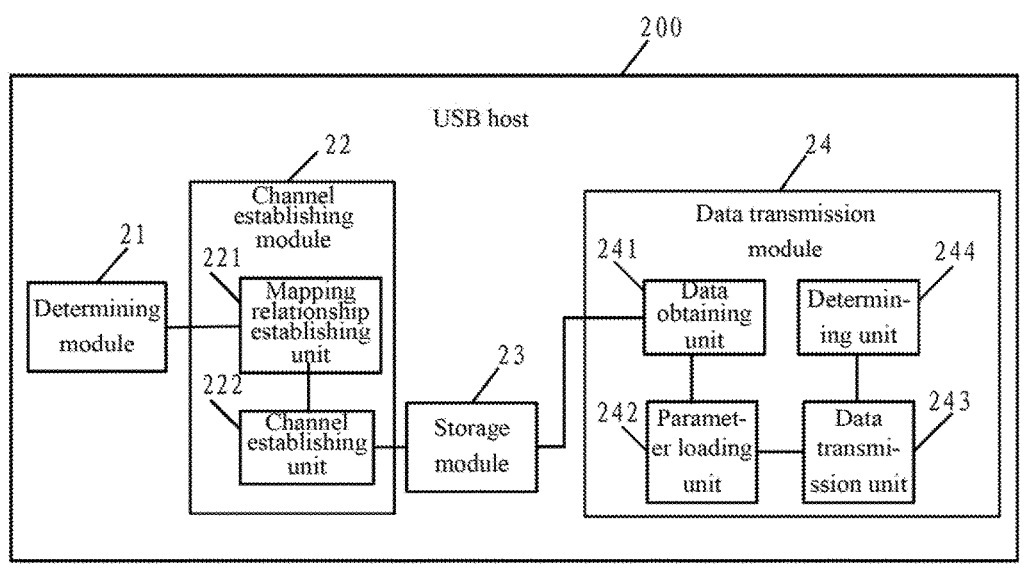
FIG. 2 is a schematic structural view of an electronic device according to a second embodiment of the present disclosure.

FIG. 2 is a schematic structural view of an electronic device according to a second embodiment of the present disclosure. As shown in FIG. 2, the electronic device comprises a USB host 200 which includes a plurality of local endpoints. The USB host 200 comprises a determining module 21, a channel establishing module 22, a storage module 23 and a data transmission module 24.

The determining module 21 is configured to determine whether at least two remote endpoints are tied to the local endpoints.

The channel establishing module 22 is coupled to the determining module 21. When the determining module 21 determines that at least two remote endpoints are tied to the local endpoints, the channel establishing module 22 establishes transmission channels between the local endpoints and the remote endpoints. At least one of the local endpoints corresponds to at least two of the remote endpoints, and at least two transmission channels are established to use the remote endpoints as much as possible for transmitting data by using the transmission channels in a time-slice manner.

Specifically, the channel establishing module 22 comprises a mapping relationship establishing unit 221 and a channel establishing unit 222. The mapping relationship establishing unit 221 is coupled to the determining module 21 and is configured to establish mapping relationships between the local endpoints and the remote endpoints. The mapping relationships include one-to-one correspondence mapping and one-to-multiple correspondence mapping. The channel establishing unit 222 is coupled to the mapping relationship establishing unit 221 and is configured to establish transmission channels between the local endpoints and the remote endpoints according to the mapping relationships established by the mapping relationships.

The storage module 23 is coupled to the channel establishing module 22. Specifically, the storage module 23 is coupled to the channel establishing unit 222, and is configured to store data of the remote endpoints corresponding to the local endpoints into a data queue after the transmission channels are established. The data comprises a plurality of USB logic device request blocks, corresponding remote endpoints parameter information and the local endpoints information.

The data transmission module 24 is coupled to the storage module 23, and is configured to transmit the USB request blocks via the transmission channels after obtaining the USB request blocks from the storage module 23.

Specifically, the data transmission module 24 comprises a data obtaining unit 241, a parameter loading unit 242, a data transmission unit 243 and a determining unit 244. The data obtaining unit 241 is coupled to the storage module 23, and is configured to obtain the USB request blocks from the data queue stored in the storage module 23 on the principle of first-in first-out (FIFO). The parameter loading unit 242 is coupled to the data obtaining unit 241, and is configured to load physical parameters corresponding to the local endpoints which transmit the USB request blocks obtained by the data obtaining unit 241. The physical parameters comprise the endpoint serial numbers of the remote endpoints corresponding to the USB request blocks. The data transmission unit 243 is coupled to the data loading unit 242. When physical parameters corresponding to the local endpoints are loaded by the parameter loading unit 242, the data transmission unit 243 serializes the USB request blocks obtained from the data obtaining unit 241 into physical signals from the local endpoints via a USB hardware module, and transmits the physical signals to the corresponding remote endpoints. The determining unit 244 is coupled to the transmission unit 243, and is configured to determine whether transmission of the plurality of USB request blocks in the data queue is completed after the transmission unit 243 transmits the USB request blocks. If the determining unit 244 determines that transmission of the plurality of USB request blocks in the data queue is not completed, the data obtaining unit 241 obtains the USB request blocks from the data queue on the principle of first-in first-out (FIFO) and waits for dispatching.

Figure 3:
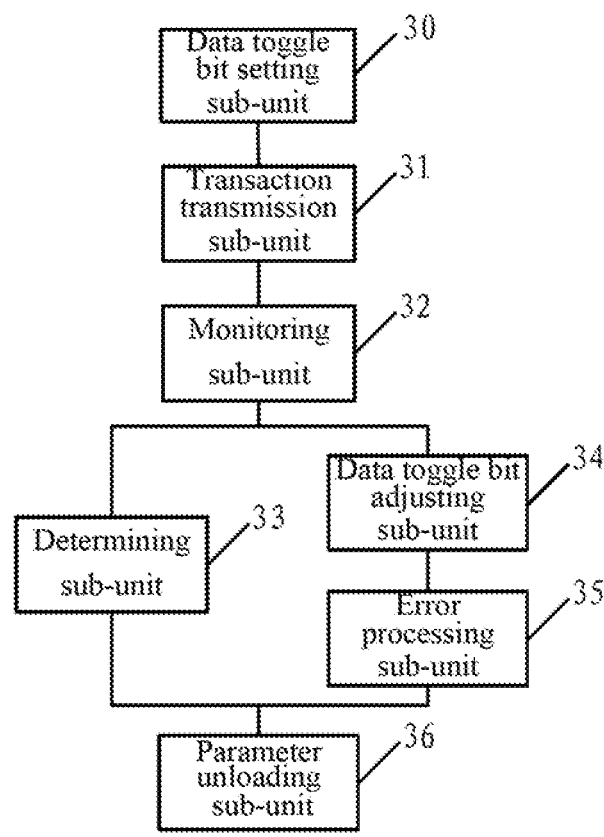
FIG. 3 is a schematic structural view of a first example of a data transmission unit in the electronic device shown in FIG. 2.

FIG. 3 is a schematic structural view of a first example of the data transmission unit in the electronic device shown in FIG. 2. As shown in FIG. 3, the data transmission unit comprises a data toggle bit setting sub-unit 30, a transaction transmission sub-unit 31, a monitoring sub-unit 32, a determining sub-unit 33, a data toggle bit adjusting sub-unit 34, an error processing sub-unit 35 and a parameter unloading sub-unit 36.

The data toggle bit setting sub-unit 30 is coupled to the parameter unloading unit 242, and is configured to set the data toggle bits corresponding to the transmission channels established by the channel establishing module 22 after the physical parameters corresponding to the local endpoints is loaded by the parameter loading unit 242 and before the USB request blocks are transmitted by the transmission channels.

The transaction transmission sub-unit 31 is coupled to the data toggle bit setting sub-unit 30, and is configured to transmit token packets, data packets and handshake packets corresponding to the transactions in the USB request blocks in sequence. The USB transaction blocks include a plurality of transactions, and the data packets are transmitted according to the data toggle bits corresponding to the transmission channels set by the data toggle bit setting sub-unit 30.

The monitoring sub-unit 32 is coupled to the transaction transmission sub-unit 31, and is configured to monitor whether a transmission state flag bit indicates that the transmission is correct during transmitting the transactions by the transaction transmission sub-unit 31.

The determining sub-unit 33 is coupled to the monitoring sub-unit 32, and is configured to determine whether transmission of the plurality of transactions in the USB request blocks is completed when the transmission state flag bit indicates that the transmission is correct as monitored by the monitoring sub-unit 32. If the determining sub-unit 33 determines that transmission of the plurality of transactions in the USB request blocks is not completed, the transaction transmission sub-unit 31 transmits the token packets, the data packets and the handshake packets corresponding to the transactions in the USB request blocks in sequence.

The data toggle bit adjusting sub-unit 34 is coupled to the monitoring sub-unit 32, and is configured to adjust the data toggle bits corresponding to the transmission channels when the transmission state flag bit indicates a transmission error as monitored by the monitoring sub-unit 32.

The error processing sub-unit 35 is coupled to the data toggle bit adjusting sub-unit 34, and is configured to perform an error processing on the USB request blocks after the data toggle bits correspond to the transmission channels is adjusted by the data toggle bit adjusting sub-unit 34.

The parameter unloading sub-unit 36 is coupled to the determining sub-unit 33 and the error processing sub-unit 35 respectively, and is configured to, after the determining sub-unit 35 determines that transmission of the plurality of transactions in the USB request blocks is completed or the error processing sub-unit 35 completes error processing on the USB request blocks, unload the physical parameters corresponding to the local endpoints that transmit the USB request blocks.

The determining unit 244 is coupled with the parameter unloading sub-units 36. After the plurality of physical parameters corresponding to the local endpoints that transmit the USB request blocks is unloaded by the parameter unloading sub-unit 36, the determining unit 244 further determine whether transmission of the plurality of USB request blocks in the data queue is completed.

Figure 4:
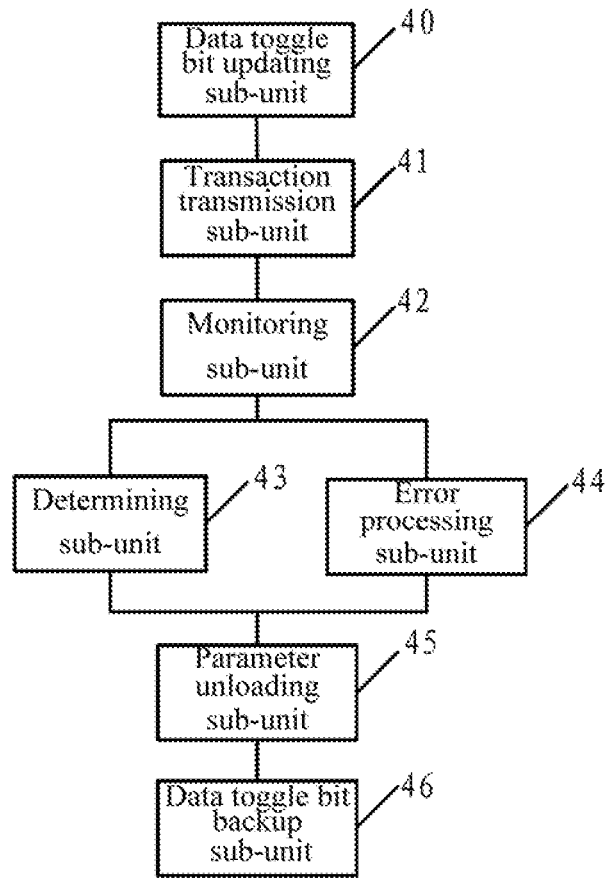
FIG. 4 is a schematic structural view of a second example of a data transmission unit in the electronic device shown in FIG. 2.

FIG. 4 is a schematic structural view of a second example of the data transmission unit in the electronic device shown in FIG. 2. As shown in FIG. 4, the data transmission unit comprises a data toggle bit updating sub-unit 40, a transaction transmission sub-unit 41, a monitoring sub-unit 42, a determining sub-unit 43, an error processing sub-unit 44, a parameter unloading sub-unit 45 and a data toggle bit backup sub-unit 46.

In the exemplary embodiment, the transaction transmission sub-unit 41, the monitoring sub-unit 42, the determining sub-unit 43, the error processing sub-unit 44 and the parameter unloading sub-unit 45 are similar to the transaction transmission sub-unit 31, the monitoring sub-unit 32, the determining sub-unit 33, the error processing sub-unit 35 and the parameter unloading sub-unit 36, and the brief descriptions are omitted thereof.

The data toggle bit updating sub-unit 40 is coupled to the parameter loading unit 242, and is configured to update the data toggle bit corresponding to the transmission channels when the physical parameters corresponding to the local endpoints is loaded by the parameter loading unit 242 and before the next USB request block is transmitted.

The data toggle bit backup sub-unit 46 is coupled to the parameter unloading sub-unit 45. After a current USB request block is transmitted by the data transmission unit 243, the data toggle bit backup sub-unit 46 backs up data toggle bits of the corresponding transmission channels. Ways to obtain the data toggle bits are well known to those skilled in the art, and will not be further described herein.

The determining unit 244 is coupled to the data toggle bit backup sub-unit 46. After the data toggle bit of the corresponding transmission channels calculated by the hardware is backed up by the data toggle bit backup sub-unit 46, the determining unit 244 further determines whether transmission of the plurality of USB request blocks in the data queue is completed.

Figure 5:
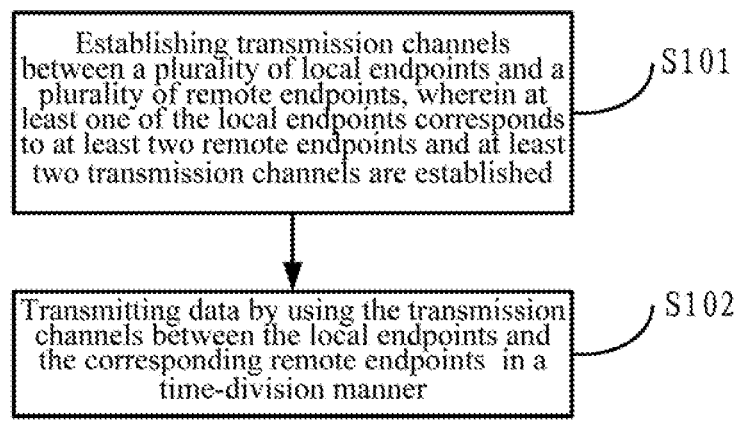
FIG. 5 is a flowchart diagram of a data transmission method according to the third embodiment of the present disclosure.

FIG. 5 is a flowchart diagram of a data transmission method according to the third embodiment of the present disclosure. The data transmission method is used in a USB host having a plurality of local endpoints. As shown in FIG. 5, the method comprises the following steps:

Step S101: establishing transmission channels between the local endpoints and a plurality of remote endpoints, wherein at least one of the local endpoints corresponds to at least two remote endpoints and at least two transmission channels are established; and Step S102: transmitting data by using the transmission channels between the local endpoints and the corresponding remote endpoints in a time-slice manner.

In step S101, the local endpoints are located in the USB host, the remote endpoints are located in a plurality of USB logic devices, and the USB host and the USB logic devices communicate data with each other through the transmission channels established between the local endpoints and the remote endpoints.

If the number of local endpoints in the USB host is equal to or greater than the total number of remote endpoints expected in the USB logic devices, the transmission channels established between the USB host and the USB logic devices may be one-to-one correspondence transmission channels or one-to-multiple correspondence transmission channels. On the other hand, if the number of local endpoints in the USB host is smaller than the total number of remote endpoints expected in the USB logic devices, a plurality of one-to-multiple correspondence transmission channels may be established between the USB host and the USB logic devices according to the expected maximum number of USB logic devices that can be supported by the product. Data transmission can be accomplished by using the local endpoints in a time-slice manner in a one-to-multiple correspondence transmission channel.

In step S102, after a one-to-multiple correspondence transmission channel is established, the data to be transmitted are transmitted between one local endpoint and at least two corresponding remote endpoints by using the transmission channel in a time-slice manner. Time-slice manner means that data to be transmitted between the same local endpoint and the at least two corresponding remote endpoints is transmitted according to time slices. In each time slice, only USB logic device data request blocks to be transmitted between the same local endpoint and a certain remote endpoint is transmitted; and data to be transmitted between the same local endpoint and at least two corresponding remote endpoints is transmitted through the transmission channel in turn in different time slices according to the data request blocks from the USB logic devices.

According to the data transmission method of the first embodiment of the present disclosure, one-to-one correspondence or one-to-multiple correspondence transmission channels are established between the local endpoints and the remote endpoints, and data is transmitted through the transmission channels in a time-slice manner. In this way, data transmission between the USB host and the USB logic devices can be achieved even when the number of remote endpoints included in a plurality of USB logic devices operating simultaneously is greater than the number of local endpoints included in the USB host.

Figure 6:
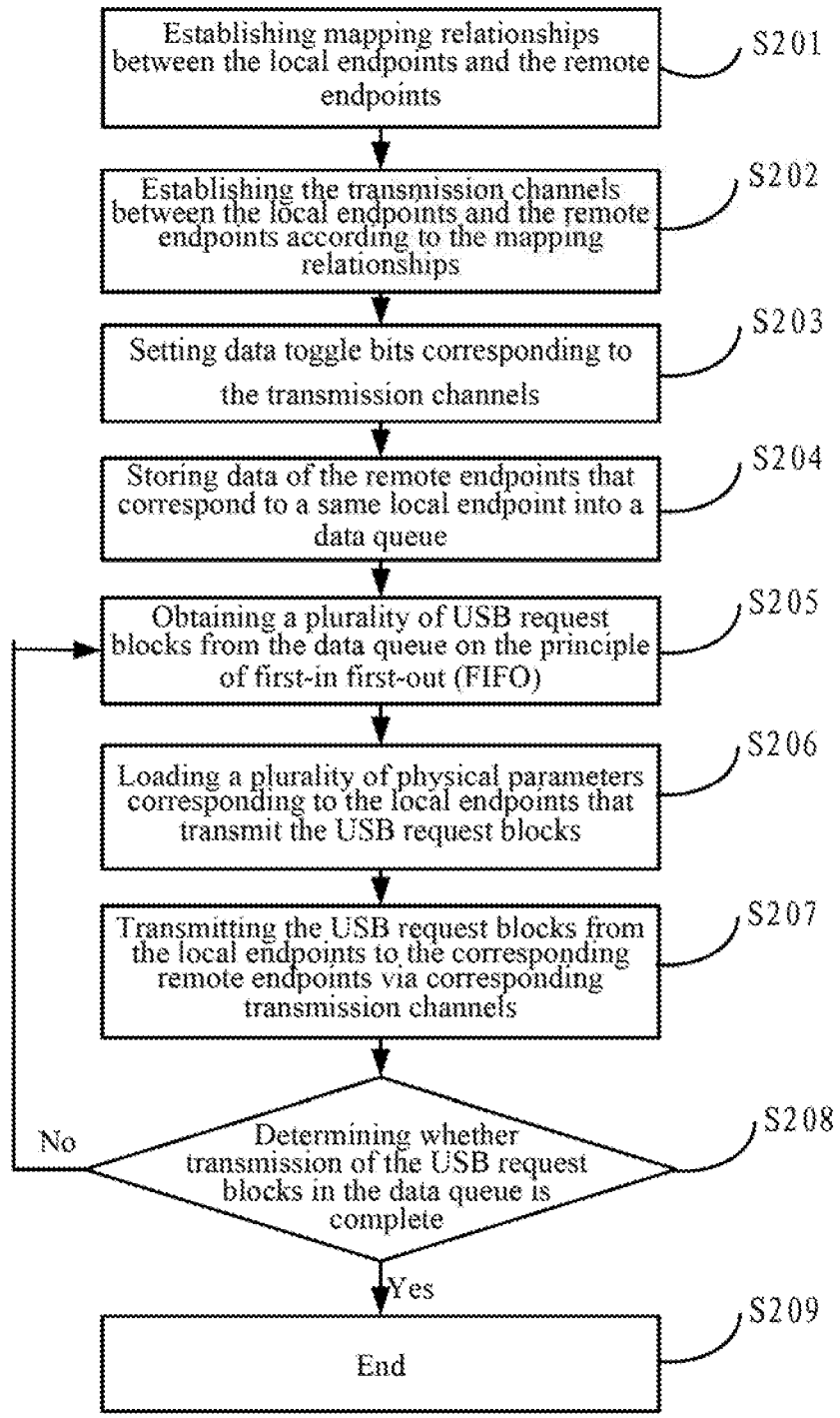
FIG. 6 is a flowchart diagram of a data transmission method according to the fourth embodiment of the present disclosure.

FIG. 6 is a flowchart diagram of a data transmission method according to the fourth embodiment of the present disclosure. This data transmission method of the present disclosure is used in a USB host having a plurality of local endpoints. It is to be noted that, the method of the present disclosure is not limited to the sequence shown in FIG. 6 as long as substantially the same results can be obtained. As shown in FIG. 6, the method comprises the following steps:

Step S201: establishing mapping relationships between the local endpoints and the remote endpoints.

The USB host obtains the remote endpoints information from the USB logic devices during enumeration. After obtaining remote endpoints of the USB logic devices, the USB host loads client driver of the USB logic device corresponding to the device that is plugged in. The client driver determines whether it is necessary to establish mapping relationships between the local endpoints and the corresponding remote endpoints of the USB logic devices. When the local endpoints is tied to the remote endpoints, the client driver establishes transmission channels between the local endpoints and the remote endpoints, and invokes the USB controller driver system interface of the lower layer to record the mapping relationships between the local endpoints and the remote endpoints. When one local endpoint is tied to at least two remote endpoints, the at least two endpoints will transmit data through the transmission channel therebetween in a time-slice manner.

In step S201, mapping comprises one-to-one correspondence mapping and one-to-multiple correspondence mapping. The one-to-one correspondence mapping means that the mapping relationship is established between one local endpoint and one remote endpoint, while a one-to-multiple correspondence mapping means that the mapping relationship is established between one local endpoint and multiple remote endpoints.

Further, the USB host may establish mapping relationships between the local endpoints and the remote endpoints in an ordinary ascending order, an ordinary descending order, a spaced apart ascending order or a spaced apart descending order. Specifically, assume that the total number of local endpoints supported by the USB host is 31, namely, 15 input endpoints, 15 output endpoints and a local endpoint 0. Local endpoint 0 is a default endpoint that is used by the USB logic devices to obtain a device descriptor, a configuration descriptor, an interface descriptor or the like thereof through use of an address 0 during the enumeration process. Therefore, mapping relationship is formed between the local endpoint 0 and the remote endpoint 0 of a plurality of USB logic devices. For endpoints other than the local endpoint 0, the allowed number of remote endpoints depends on practical demands. When the number of remote endpoints allowed to be mapped to a certain local endpoint is 1, a one-to-one correspondence relationship is formed between the local endpoint and the remote endpoint; and when the number of remote endpoints allowed to be mapped to a certain local endpoint is equal to or greater than 2, a one-to-multiple correspondence relationship is formed between the local endpoint and the remote endpoints.

The ordinary ascending order means that the mapping relationships between the local endpoints and a plurality of remote endpoints of a corresponding type in an ascending order of the endpoint serial numbers. That is, mapping relationships between input endpoint 1 and remote endpoints for outputting are established firstly, and when the number of remote endpoints reaches the maximum number of remote endpoints allowed for the input endpoint 1, mapping relationships between the input endpoint 2 and a plurality of remote endpoints for outputting are established, . . . , and so on. This process is performed until the mapping relationships between all the remote endpoints and the input endpoints have been established. The mapping relationships of the 15 output endpoints may be established in a similar way, and is not be further described herein.

The ordinary descending order means that the mapping relationships between the local endpoints and a plurality of remote endpoints of a corresponding type in a descending order of the endpoint serial numbers. The main difference between the ordinary descending order and the ordinary ascending order is that for the ordinary descending order, the mapping relationships are established in a descending order of the endpoint serial numbers, but for the ordinary ascending order, the mapping relationships are established in an ascending order of the endpoint serial numbers.

The spaced apart ascending order means that the mapping relationships are established between an input endpoint and an output endpoint having the same serial number and a plurality of remote endpoints of a corresponding type in an ascending order of the endpoint serial numbers. That is to say, establishing mapping relationships between the input endpoint 1 and the output endpoint 1 and a plurality of remote endpoints of a corresponding type simultaneously first, when number of the remote endpoints reaches a maximum number of endpoints allowed for the input endpoint 1 and the output endpoint 1, mapping relationships between the input endpoint 2 and the output endpoint 2 and a plurality of remote endpoints of a corresponding type are established, . . . , and so on. This process is repeated until mapping relationships between input endpoint 15 and output endpoint 15 and the remote endpoints of a corresponding type have been established. As can be easily appreciated by those skilled in the art, when the mapping relationships are established in the spaced apart ascending order, the maximum number of remote endpoints allowed for the input endpoint is the same as that allowed for the output endpoint having the same serial number.

The spaced apart descending order means that the mapping relationships between an input endpoint and an output endpoint having the same serial number and a plurality of remote endpoints of a corresponding type in a descending order of the endpoint serial numbers. The main difference between the spaced apart descending order and the spaced apart ascending order is that for the spaced apart descending order, the mapping relationships are established in a descending order of the endpoint serial numbers, but for the spaced apart ascending order, the mapping relationships are established in an ascending order of the endpoint serial numbers.

Step S202: establishing the transmission channels between the local endpoints and the remote endpoints according to the mapping relationships. When a local endpoint and a remote endpoint have a one-to-one correspondence relationship there between, data can be transmitted between the local endpoint and the remote endpoint according to the protocol specified in the USB standard. This is already known in the prior art and is not further described herein. When a local endpoint and a plurality of remote endpoints have a one-to-multiple relationship there between, the transmission channel established between the local endpoint and the remote endpoints can be used in a time-slice manner. Specifically, the USB host ties one local endpoint to a plurality of remote endpoints according to the mapping relationships to establish a transmission channel which can be used in a logically time-division manner, and establishes data structure corresponds to each remote endpoint in the transmission channel used in a time-slice manner according to an interface descriptor obtained by the USB device during the enumeration process. Then, step S203 is executed.

Step S203: setting data toggle bits corresponding to the transmission channels. In step S203, the data toggle bits are variables stored in the USB host, and correspond to the data toggle bits in the USB logic devices during data transmission to ensure accuracy of the data transmission. Specifically, the data toggle bit flips over each time a transaction in the data is transmitted. Therefore, value of the data toggle bit after the whole data has been transmitted can be obtained by obtaining number of times that the data toggle bit flips over according to number of times that transactions need to be transmitted. A time-slice transmission channel is a transmission channel between one local endpoint and a plurality of remote endpoints, thus a data toggle bit should be set for each of the remote endpoints in the time-slice transmission channel. Each time data transmission between the local endpoint and a certain remote endpoint is completed, the value of the data toggle bit obtained is stored into the data toggle bit variable corresponding to the remote endpoint to correspond to the data toggle bit in the USB logic device having the remote endpoint.

Step S204: storing data of the remote endpoints that correspond to a same local endpoint into a data queue. In step S204, a plurality of remote endpoints correspond to the same local endpoint, and the same local endpoint corresponds to the data queue. The data in the data queue may be USB request blocks of a plurality of remote endpoints in one USB logic device, or USB request blocks of a plurality of remote endpoints in a plurality of USB logic devices.

Step S205: obtaining a plurality of USB request blocks from the data queue on the principle of first-in first-out (FIFO). In step S205, "FIFO" means that a USB request block firstly stored will be firstly read and transmitted, and once it is transmitted, a next USB request block will be read and transmitted, and so on. The USB request blocks also include information of the remote endpoints of the USB device to be accessed.

Step S206: loading a plurality of physical parameters corresponding to the local endpoints that transmit the USB request blocks. In step S206, the physical parameters of the local endpoint comprise information of remote endpoints corresponding to the USB request blocks and control information of the USB device, as shown in Table 1.

TABLE 1

| Information of remote endpoints | Control information |
| --- | --- |
| Byte length | Speed type |
| Descriptor type | Address information |
| Remote endpoint serial number | Dynamic FIFO |
| Transmission direction | Data toggle bit |
| Transfer type | |
| Max. packet size | |
| Time interval | |

As shown in above table, the Remote endpoint information comprises a byte length of the remote endpoint descriptor, which is fixed to be 0x07, a Description type, which is fixed to be 0x05, a 4-bit endpoint serial number of the remote endpoint, a 1-bit transmission direction of the remote endpoint, which is used to distinguish whether the remote endpoint is used for input or for output, a transfer type used by the remote endpoint, which comprises control transfer, batch transfer, interrupt transfer and synchronous transfer, a Maximum packet size supported by the remote endpoint, which refers to the maximum number of bytes that can be transmitted at a time during serial transmission between the USB host and the USB device through the transmission channel, and usually, both the USB host and the USB device are provided with at least an FIFO memory that can store a maximum byte size data, and a time interval of data transmission of the remote endpoint. Usually, the USB host schedules use of the bandwidth of the transmission channel according to these parameters.

The control information comprises the speed type, which is used to distinguish whether the USB device is a low-speed device, a high-speed device or a full-speed device, the address information (Function address/Hub address/Port Number), which is a unique address used for communication between the USB host and the USB device, the dynamical FIFO, which is a buffer, a data toggle bit, which toggles between Data0/Data1 so that serial data transmitted through the transmission channel can be accurately received between the USB host and the USB device and the data toggle bit is a value stored in the data toggle bit variable corresponding to the remote endpoint.

Step S207: transmitting the USB request blocks from the local endpoints to the corresponding remote endpoints via corresponding transmission channels. In step S207, after the physical parameters of the local endpoint are loaded (i.e., after the physical parameters of the local endpoint are written into hardware), the hardware module of the USB controller transforms the USB logic device data request blocks of the currently corresponding remote endpoint into a physical signal and transmit the physical signal to the plugged USB device. The USB request blocks are transmitted according to the data toggle bit corresponding to the transmission channel. Specifically, the data toggle bit flips over each time transmission of a transaction in the USB request blocks is complete, and the value of the data toggle bit is stored into the data toggle bit variable corresponding to the remote endpoint after transactions of all USB request blocks have been transmitted.

Step S208: determining whether transmission of the USB request blocks in the data queue is completed. If the decision is "No", step S205 will be executed; and if the decision is "Yes", the process will end (S209). In step S208, if transmission of the USB request blocks in the data queue is not completed, the process continues to read the next transaction of the USB request blocks from the data queue on the principle of FIFO and transmits the transaction.

For example, assume that a transmission channel is established between local endpoint A and remote endpoints B and C. A USB request block is obtained from the data queue. Assuming that the USB request block is transmitted from endpoint A to remote endpoint C, a plurality of physical parameters of endpoint A corresponding to the USB request block are loaded according to description of the current USB request block. The physical parameters comprise an endpoint serial number of remote endpoint C, the transmission type between local endpoint A and remote endpoint C, and so on. Next, a plurality of transactions of the current USB request block is transmitted from local endpoint A to remote endpoint C via the transmission channel between local endpoint A and remote endpoints B and C according to the data toggle bit corresponding to remote endpoint C until all the transactions in the USB request block are transmitted. The next USB request block is acquired from the data queue. Assuming that this USB request block is transmitted from endpoint A to remote endpoint B, a plurality of physical parameters of endpoint A corresponding to USB request block are loaded according to the description of the USB request block. The physical parameters comprise an endpoint serial number of remote endpoint B, the transmission type between local endpoint A and remote endpoint B and so on. Next, the current USB request block is transmitted from local endpoint A to remote endpoint B via the transmission channel between local endpoint A and remote endpoints B and C according to the data toggle bit corresponding to remote endpoint B. Then the next USB request block is acquired, . . . . , and so on, and this process is repeated until all the USB request blocks in the data queue are transmitted. As can be understood by those skilled in the art, by using the transmission channel between local endpoint A and remote endpoints B and C, communication between local endpoint A and remote endpoint B as well as between local endpoint A and remote endpoint C are accomplished.

Figure 7:
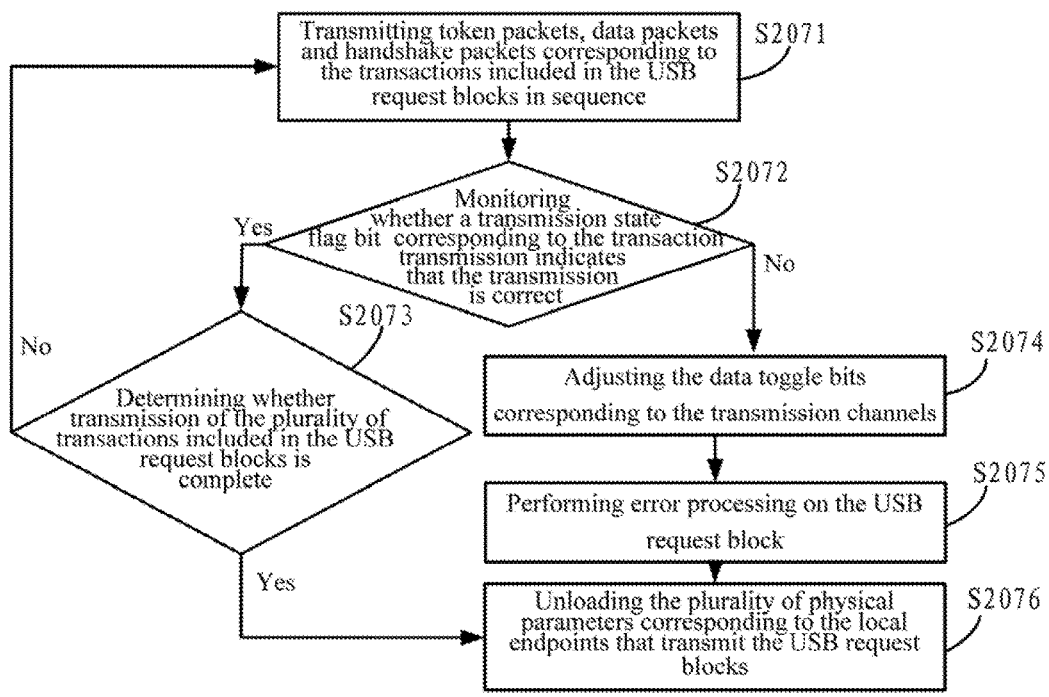
FIG. 7 is a sub-flowchart diagram of the data transmission method according to the fourth embodiment of the present disclosure.

FIG. 7 is a sub-flowchart diagram of the data transmission method according to the fourth embodiment of the present disclosure. Specifically, FIG. 7 is a sub-flowchart diagram illustrating step S207 in FIG. 6. It is to be noted that, the method of the present disclosure is not limited to the sequence shown in FIG. 7 as long as substantially the same results can be obtained. As shown in FIG. 7, the method comprises the following steps:

Step S2071: transmitting token packets, data packets and handshake packets corresponding to the transactions included in the USB request blocks in sequence. In step S2071, the USB request blocks comprise a plurality of transactions, each of which comprises a token packet, a data packet and a handshake packet. The token packet defines type of the transaction processing. The data packet is used for data transmission. The handshake packet is used to provide the data sender with a feedback signal so as to notify the sender whether the data has been received correctly. Furthermore, the data packet is transmitted according to the data toggle bit corresponding to the transmission channel. Specifically, the data toggle bit flips over each time transmission of a transaction data packet in a USB request block is complete.

Step S2072: monitoring whether a transmission state flag bit corresponding to the transaction transmission indicates that the transmission is correct. If the transmission state flag bit indicates that the transmission is correct, step S2073 is executed; and if the transmission state flag bit indicates a transmission error, step S2074 is executed. In step S2072, the transmission state flag bit may be handshake packets corresponding to transactions. For example, the handshake packets include four kinds of packets, namely, ACK packet, NAK packets, STALL packets and NYET packet. Specifically, an ACK packet represents that data has been received by the receiver successfully, an NAK packet represents that the receiver cannot receive the data or the transmitter cannot transmit the data, an STALL packet represents that the remote endpoint has been terminated, and an NYET packet represents that no response has been made by the receiver yet. The transmission state flag bit may also be a serial interface engine (SIE) transmission error flag bit. The transmission state flag bit may also be some other flag bit which can be used to distinguish between transaction states. The specific form and contents of the transmission state flag bit are not limited in the present disclosure as long as it can be used to monitor whether transactions are transmitted properly.

Step S2073: determining whether transmission of the plurality of transactions included in the USB request blocks is complete; and if the decision is "yes", step S2076 is executed; and if the decision is "no", step S2071 is executed.

Step S2074: adjusting the data toggle bits corresponding to the transmission channels. In step S2074, when an error occurs during the transmission of a USB request block (i.e., when an error occurs during the transmission of transactions included in the USB request block), the data toggle bit of the remote endpoint corresponding to the USB request block in the transmission channel is adjusted to ensure accuracy of the data transmission between the USB host and the USB device.

Step S2075: performing error processing on the USB request block. In step S2075, re-transmission may be initiated to perform the error processing if transmission of the USB request block fails. It is not limited when the re-transmission is initiated in the present disclosure as long as successful transmission of the USB request block can be achieved.

Step S2076: unloading the plurality of physical parameters corresponding to the local endpoints that transmit the USB request blocks. In step S2076, once transmission of the USB request block is completed, the physical parameters of the local endpoint corresponding to the USB request block are removed to ensure proper transmission of the next USB request block.

By establishing one-to-one correspondence mapping or one-to-multiple correspondence mapping transmission channels, data transmission between the USB host and the USB logic devices is accomplished by the method according to the second embodiment of the present disclosure. Furthermore, by obtaining the data toggle bit according to the number of transaction transmissions, the present disclosure ensures that the data toggle bit of the USB host corresponds to that of the USB device, which further improves accuracy of the data transmission between the USB host and the USB device.

Figure 8:
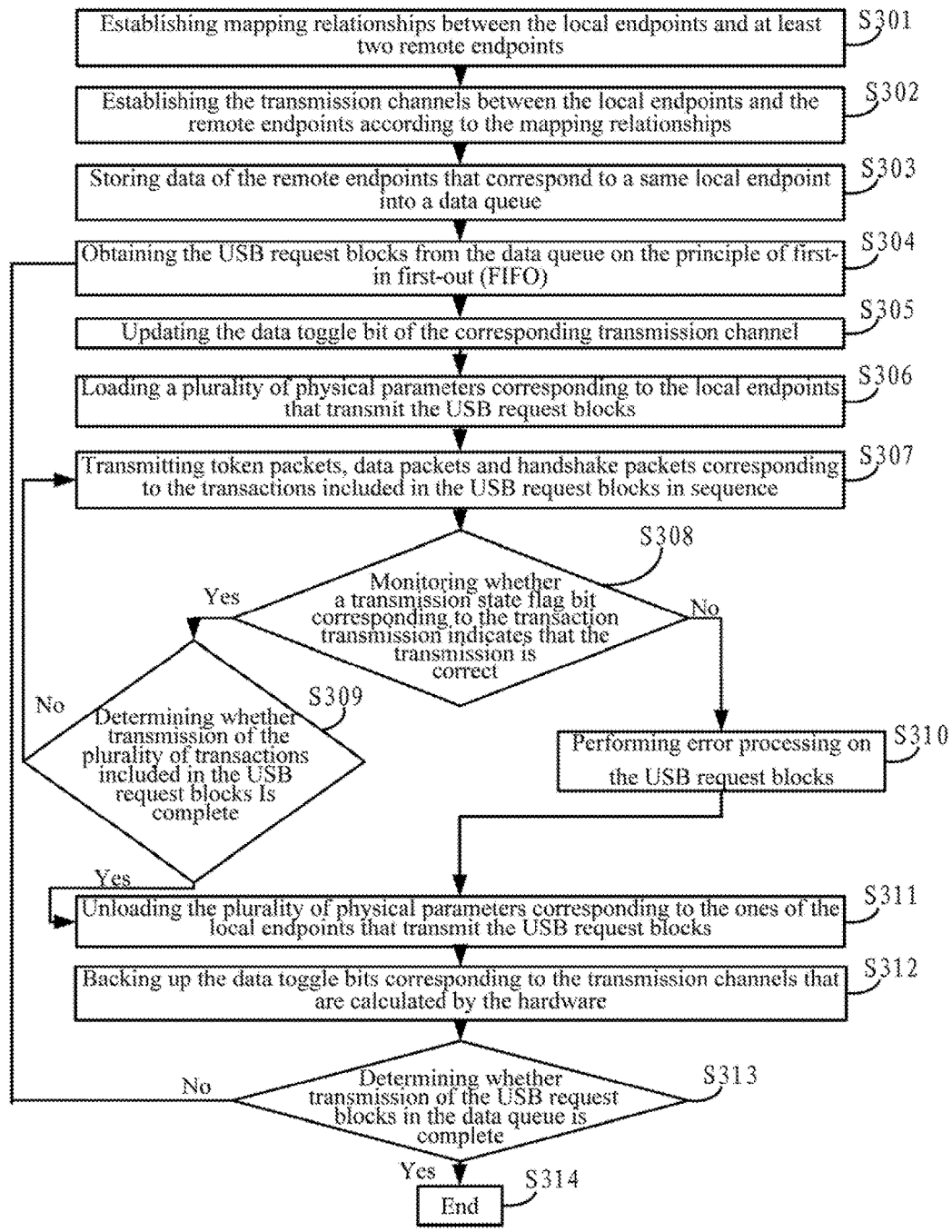
FIG. 8 is a flowchart diagram of a data transmission method according to a fifth embodiment of the present disclosure.

FIG. 8 is a flowchart diagram of a data transmission method according to a fifth embodiment of the present disclosure. The data transmission method of the present disclosure is used in a USB host having a plurality of local endpoints. It is to be noted that, the method of the present disclosure is not limited to the sequence shown in FIG. 8 as long as substantially the same results can be obtained. As shown in FIG. 8, the method comprises the following steps:

Step S301: establishing mapping relationships between the local endpoints and at least two remote endpoints. In this embodiment, step S301 is similar to step S201 shown in FIG. 6, and is not further described herein.

Step S302: establishing the transmission channels between the local endpoints and the remote endpoints according to the mapping relationships. In this embodiment, step S302 is similar to step S202 shown in FIG. 6, and is not further described herein.

Step S303: storing data of the remote endpoints that correspond to a same local endpoint into a data queue. In this embodiment, step S303 is similar to step S204 shown in FIG. 6, and is not further described herein.

Step S304: obtaining the USB request blocks from the data queue on the principle of first-in first-out (FIFO). In this embodiment, step S304 is similar to step S205 shown in FIG. 6, and is not further described herein.

Step S305: updating the data toggle bit of the corresponding transmission channel. In step S305, the value of the data toggle bit is a value in a register for recording the automatic flipping conditions when USB request blocks are transmitted by the hardware. Specifically, the USB host comprises a memory storage accelerating module, and during operation of the accelerating module, the value of the automatically flipped data toggle bit is recorded by the USB host by using the register. After transmission of a previous USB request block is complete, the data toggle bit of the remote endpoint corresponding to the current USB request block is updated to ensure accuracy of the data transmission between the USB host and the USB device.

Step S306: loading a plurality of physical parameters corresponding to the local endpoints that transmit the USB request blocks. In this embodiment, step S306 is similar to step S206 shown in FIG. 6, and is not further described herein.

Step S307: transmitting token packets, data packets and handshake packets corresponding to the transactions included in the USB request blocks in sequence. In this embodiment, step S307 is similar to step S2081 shown in FIG. 7, and is not further described herein.

Step S308: monitoring whether a transmission state flag bit corresponding to the transaction transmission indicates that the transmission is correct. If the transmission state flag bit indicates that the transmission is correct, step S309 is executed; and if the transmission state flag bit indicates a transmission error, step S310 is executed. In this embodiment, step S308 is similar to step S2072 shown in FIG. 7, and is not further described herein.

Step S309: determining whether transmission of the plurality of transactions included in the USB request blocks is complete. If the decision is "yes", step S311 is executed; and if the decision is "no", step S307 is executed.

Step S310: performing error processing on the USB request blocks. In this embodiment, step S310 is similar to step S2085 shown in FIG. 7, and is not further described herein.

Step S311: unloading the plurality of physical parameters corresponding to the local endpoints that transmit the USB request blocks. In this embodiment, step S311 is similar to step S2076 shown in FIG. 7, and is not further described herein.

Step S312: backing up the data toggle bits corresponding to the transmission channels that are calculated by the hardware. In step S312, after transmission of a current USB request block is complete, the data toggle bit of the remote endpoint in the transmission channel of the corresponding USB request block is saved. When a subsequent USB request block is to be transmitted via the remote endpoint, the saved value will be restored into the physical parameters corresponding to the local endpoint.

Step S313: determining whether transmission of the USB request blocks in the data queue is complete. If the decision is "no", step S304 is executed; and if the decision is "yes", the process ends (S314). In this embodiment, step S313 is similar to step S208 shown in FIG. 6, and is not further described herein.

By establishing a one-to-one correspondence mapping or one-to-multiple correspondence mapping transmission channels when the number of remote endpoints included in a plurality of USB logic devices is greater than the number of local endpoints included in the USB host, data transmission between the USB host and the USB logic devices is accomplished by the method according to the third embodiment of the present disclosure. Furthermore, by reading the register to obtain the value of the data toggle bit, the present disclosure ensures that the data toggle bit of the USB host corresponds to that of the USB device, which further improves accuracy of the data transmission between the USB host and the USB device.

As may be understood by those skilled in the art, for the remote devices (i.e., for externally connected USB devices), it is unnecessary to make modifications on the present disclosure in terms of data transmission, software and hardware. That is, the present disclosure is compatible with any externally connected USB devices.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed:

1. A data transmission method, used in a universal serial bus (USB) host having a plurality of local endpoints, the data transmission method comprising:
    establishing transmission channels between the local endpoints and a plurality of remote endpoints, wherein a number of the local endpoints is less than a number of the remote endpoints, at least one of the local endpoints corresponds to at least two of the remote endpoints and at least two transmission channels are established;
    storing data of the remote endpoints that correspond to a same one of the local endpoints into a data queue;
    obtaining a plurality of first USB request blocks from the data queue on the principle of first-in-first-out (FIFO);
    loading a plurality of first physical parameters according to a description of the first USB request blocks, wherein the first physical parameters correspond to the same one of the local endpoints and a first one of the remote endpoints, and the first physical parameters comprise a serial number of the first one of the remote endpoints;
    transmitting transactions included in the first USB request blocks from the same one of the local endpoints to the first one of the remote endpoints;
    when it is determined that transmission of the transactions included in the first USB request blocks is complete:
        unloading the plurality of first physical parameters;
        obtaining a plurality of second USB request blocks from the data queue on the principle of FIFO;
        loading a plurality of second physical parameters according to a description of the second USB request blocks, wherein the second physical parameters correspond to the same one of the local endpoints and a second one of the remote endpoints, and the second physical parameters comprise a serial number of the second one of the remote endpoints; and
        transmitting transactions of the second USB request blocks from the same one of the local endpoints to the second one of the remote endpoints.

2. The method of claim 1, wherein the first physical parameters further comprise a transmission type between the same one of the local endpoints and the first one of the remote endpoints, and the second physical parameters further comprise a transmission type between the same one of the local endpoints and the second one of the remote endpoints.

3. The method of claim 1, wherein the step of establishing transmission channels between the local endpoints and a plurality of remote endpoints comprises:
    establishing mapping relationships between the local endpoints and the remote endpoints; and
    establishing the transmission channels between the local endpoints and the remote endpoints according to the mapping relationships.

4. The method of claim 3, wherein the mapping relationships between the local endpoints and the remote endpoints are established in an ordinary ascending order, an ordinary descending order, a spaced apart ascending order or a spaced apart descending order.

5. The method of claim 3, further comprising:
after the step of establishing the transmission channels between the local endpoints and the remote endpoints, setting data toggle bits corresponding to the transmission channels, wherein each of the data toggle bit flips over when a transaction is transmitted in a corresponding transmission channel;
wherein the transactions included in the first USB request blocks are transmitted according to a first one of the data toggle bits which corresponds to the first one of the remote endpoints, and the transactions included in the second USB request blocks are transmitted according to a second one of the data toggle bits which corresponds to the second one of the remote endpoints.

6. The method of claim 5, wherein each of the transactions included in the first USB request blocks and the second USB request blocks comprises:
a token packet defining a type of transaction processing;
a data packet used for data transmission, wherein the data packet is transmitted according to the first one of the data toggle bits or the second one of the data toggle bits; and
a handshake packet used to determine whether the data packet is correctly received.

7. The method of claim 5, further comprising:
before the step of transmitting transactions included in the first USB request blocks, updating the first one of the data toggle bits; and
before the step of transmitting transactions included in the second USB request blocks, updating the second one of the data toggle bits.

8. The method of claim 5, further comprising:
monitoring whether a transmission state flag bit corresponding to transaction transmission indicates that the transaction transmission is correct;
when the transmission state flag bit indicates a transmission error, adjusting the data toggle bits corresponding to the transmission channels and performing error processing on the first USB request blocks or the second USB request blocks.

9. The method of claim 5, further comprising:
backing up the data toggle bits corresponding to the transmission channels after transmission of a current USB request block is complete, wherein when a subsequent USB request block is to be transmitted via a same remote endpoint, a saved value of the data toggle bits is restored.

10. A data transmission method used in a universal serial bus (USB) host having at least one local endpoint, the data transmission method comprising:
establishing transmission channels between the local endpoint and a plurality of remote endpoints, wherein the plurality of remote endpoints are included in at least one USB device;
storing data of the plurality of remote endpoints that correspond to the local endpoint into a data queue;
obtaining a subsequent portion of USB request blocks from the data queue on the principle of first-in-first-out (FIFO);
loading a plurality of physical parameters corresponding to the local endpoint, wherein the physical parameters comprise information of a respective one of the remote endpoints corresponding to the obtained portion of USB request blocks and control information of the at least one USB device;
transmitting transactions included in the obtained portion of USB request blocks from the local endpoint to the respective one of the remote endpoints;
determining whether transmission of the transactions included in the obtained portion of USB request blocks is complete;
when the transmission of the transactions included in the obtained portion of USB request blocks is complete, unloading the plurality of physical parameters and returning to the step of obtaining a subsequent portion of USB request blocks from the data queue on the principle of FIFO until transmission of all USB request blocks in the data queue is complete.

11. The method of claim 10, wherein the step of establishing transmission channels between the local endpoint and a plurality of remote endpoints comprises:
establishing mapping relationships between the local endpoint and the remote endpoints; and
establishing the transmission channels between the local endpoint and the remote endpoints according to the mapping relationships.

12. The method of claim 10, wherein:
the information of the respective one of the remote endpoints comprises at least a serial number and transmission direction of the respective one of the remote endpoints.

13. The method of claim 10, wherein:
the control information of the at least one USB device comprises at least a data toggle bit.

14. The method of claim 13, further comprising:
after the step of establishing the transmission channels between the local endpoint and the remote endpoints, setting the data toggle bit of each of the remote endpoints corresponding to the transmission channels, wherein the data toggle bit flips over when a transaction is transmitted in a corresponding transmission channel;
wherein the transactions included in obtained portion of USB request blocks are transmitted according to one of the data toggle bits corresponding to the respective one of the remote endpoints.

15. The method of claim 14, wherein each of the transactions included in the obtained portion of USB request blocks comprises:
a token packet defining a type of transaction processing;
a data packet used for data transmission, wherein the data packet is transmitted according to the data toggle bit corresponding to the respective one of the remote endpoints; and
a handshake packet used to determine whether the data packet is correctly received.

16. The method of claim 14, further comprising:
before the step of transmitting transactions included in obtained portion of USB request blocks, updating the data toggle bit corresponding to the respective one of the remote endpoints.

17. The method of claim 14, further comprising:
monitoring whether a transmission state flag bit corresponding to transaction transmission indicates that the transaction transmission is correct;
when the transmission state flag bit indicates a transmission error, adjusting the data toggle bit and performing error processing on the obtained portion of USB request blocks.

18. The method of claim 14, further comprising:
backing up the data toggle bit after transmission of a current USB request block is complete, wherein when a subsequent USB request block is to be transmitted via a same remote endpoint, a saved value of the data toggle bit is restored.

19. An electronic device, comprising a universal serial bus (USB) host having at least one local endpoint, the electronic device comprising:
a channel establishing module, configured to establish transmission channels between the local endpoint and a plurality of remote endpoints, wherein the plurality of remote endpoints are included in at least one USB device;
a storage module, configured to store data of the plurality of remote endpoints that correspond to the local endpoint into a data queue;
a data obtaining unit, configured to obtain a subsequent portion of USB request blocks from the data queue on the principle of first-in-first-out (FIFO);
a parameter loading unit, configured to load a plurality of physical parameters corresponding to the local endpoint, wherein the physical parameters comprise information of a respective one of the remote endpoints corresponding to the obtained portion of USB request blocks and control information of the at least one USB device;
a data transmission unit, configured to transmit transactions included in the obtained portion of USB request blocks from the local endpoint to the respective one of the remote endpoints;
a determining unit, configured to determine whether transmission of the transactions included in the obtained portion of USB request blocks is complete;
wherein when the transmission of the transactions included in the obtained portion of USB request blocks is complete, the parameter loading unit unloads the plurality of physical parameters and the data obtaining unit obtains a subsequent portion of USB request blocks from the data queue on the principle of FIFO until transmission of all USB request blocks in the data queue is complete.

20. The electronic device of claim 19, wherein:
the information of the respective one of the remote endpoints comprises at least a serial number and transmission direction of the respective one of the remote endpoints; and
the control information of the at least one USB device comprises at least a data toggle bit.

* * * * *